(12) United States Patent
Oliveira Pinheiro

(10) Patent No.: US 10,956,817 B2
(45) Date of Patent: Mar. 23, 2021

(54) UNSUPERVISED DOMAIN ADAPTATION WITH SIMILARITY LEARNING FOR IMAGES

(71) Applicant: ELEMENT AI INC., Montreal (CA)

(72) Inventor: Pedro Henrique Oliveira Pinheiro, Montreal (CA)

(*) Notice: Subject to any disclaimer, the term of this patent is extended or adjusted under 35 U.S.C. 154(b) by 246 days.

(21) Appl. No.: 15/955,955

(22) Filed: Apr. 18, 2018

(65) Prior Publication Data

US 2019/0325299 A1    Oct. 24, 2019

(51) Int. Cl.
| | |
|---|---|
| *G06N 3/08* | (2006.01) |
| *G06T 3/40* | (2006.01) |
| *G06N 5/04* | (2006.01) |
| *G06T 7/00* | (2017.01) |

(52) U.S. Cl.
CPC ............. *G06N 3/08* (2013.01); *G06N 5/046* (2013.01); *G06T 3/40* (2013.01); *G06T 7/0002* (2013.01); *G06T 2207/20081* (2013.01)

(58) Field of Classification Search
CPC ........ G06N 3/08; G06N 5/046; G06N 3/0472; G06N 3/0454; G06T 3/40; G06T 7/0002; G06T 2207/20081
See application file for complete search history.

(56) References Cited

U.S. PATENT DOCUMENTS

| | | | |
|---|---|---|---|
| 10,839,269 B1* | 11/2020 | Al-Turki | G06N 3/08 |
| 2017/0011280 A1* | 1/2017 | Soldevila | G06K 9/6214 |
| 2018/0075581 A1* | 3/2018 | Shi | G06N 3/0472 |
| 2018/0359416 A1* | 12/2018 | Hold-Geoffroy | G06T 15/506 |
| 2019/0279011 A1* | 9/2019 | Kshirsagar | G06N 3/0454 |
| 2019/0286652 A1* | 9/2019 | Habbecke | A61B 34/20 |
| 2019/0295261 A1* | 9/2019 | Kang | G06N 3/0481 |
| 2020/0089966 A1* | 3/2020 | Tsai | G06N 3/0454 |
| 2020/0150622 A1* | 5/2020 | Cai | G05B 23/024 |
| 2020/0327418 A1* | 10/2020 | Lyons | G06K 9/469 |

OTHER PUBLICATIONS

Van Der Maaten et al. Visualizing data using t-SNE. Journal of Machine Learning Research, 2008.
(Continued)

*Primary Examiner* — Bobbak Safaipour
(74) *Attorney, Agent, or Firm* — Fasken Martineau Dumoulin, LLP; Serge Lapointe

(57) ABSTRACT

Systems and methods for addressing the cross domain issue using a similarity based classifier convolutional neural network. An input image is passed through a convolutional neural network that extracts its features. These features are compared to features of multiple sets of prototype representations with each set of prototype representations being extracted from and representing a category of images. The similarity between the features of the input image and features of the various prototype representations is scored and the prototype representation whose features are most similar to the features of the input image will have its label applied to the input image. The classifier is trained using images from a source domain and the input images are from a target domain. The training for the classifier is such that the classifier will be unable to determine if a specific data point is from the source domain or from the target domain.

9 Claims, 3 Drawing Sheets

(56) References Cited

OTHER PUBLICATIONS

Vinyals et al. Show and tell: A neural image caption generator. In CVPR, 2015.
Weinberger et al. Distance metric learning for large margin nearest neighbor classification. Journal of Machine Learning Research, 2009.
Xing et al. Distance metric learning, with application to clustering with side-information. In NIPS, 2003.
Ajakan et al. Domain-adversarial neural networks. 2014.
Swersky et al. Prototypical networks for few-shot learning. 2017.
Baktashmotlagh et al. Unsupervised domain adaptation by domain invariant projection. In ICCV, 2013.
Bellet et al. A survey on metric learning for feature vectors and structured data. arXiv, 2013.
Ben-David et al. A theory of learning from different domains. Machine Learning, 2010.
Ben-David et al. Analysis of representations for domain adaptation. In NIPS, 2007.
Bousmalis et al. Unsupervised pixel-level domain adaptation with generative adversarial networks. In CVPR.
Bousmalis et al. Domain separation networks. In NIPS, 2016.
Bridle. Probabilistic interpretation of feedforward classification network outputs, with relationships to statistical pattern recognition. Neurocomputing: Algorithms, Architectures and Applications, 1990.
Chechik et al. Large scale online learning of image similarity through ranking. Journal of Machine Learning Research, 2010.
Chopra et al. Learning a similarity metric discriminatively, with application to face verification. In CVPR, 2005.
Csurka et al. A comprehensive survey on domain adaptation for visual applications. In Domain Adaptation in Computer Vision Applications. 2017.
Deng et al. ImageNet: A Large-Scale Hierarchical Image Database. In CVPR, 2009.
Ganin et al. Unsupervised domain adaptation by backpropagation. In ICML, 2015.
Ganin et al. Domain-adversarial training of neural networks. Journal of Machine Learning Research, 2016.
Globerson et al. Metric learning by collapsing classes. In NIPS, 2005.
Goldberger et al. Neighbourhood components analysis. In NIPS, 2005.
Gong et al. Connecting the dots with landmarks: Discriminatively learning domaininvariant features for unsupervised domain adaptation. In ICML, 2013.
Gong et al. Geodesic flow kernel for unsupervised domain adaptation. In CVPR, 2012.
Goodfellow et al. Generative adversarial nets. In NIPS, 2014.
Gopalan et al. Domain adaptation for object recognition: An unsupervised approach. In ICCV, 2011.
Gretton et al. A kernel two-sample test. Journal of Machine Learning Research, 2012.
Gretton et al. Covariate shift and local learning by distribution matching. 2009.
He et al. Mask R-CNN. In ICCV, 2017.
He et al. Deep residual learning for image recognition. In CVPR, 2016.
Huang et al. Correcting sample selection bias by unlabeled data. In NIPS, 2007.
Jiang et al. Instance weighting for domain adaptation in nlp. In ACL, 2007.
Krizhevsky et al. Imagenet classification with deep convolutional neural networks. In NIPS, 2012.
Kulis et al. What you saw is not what you get: Domain adaptation using asymmetric kernel transforms. In CVPR, 2011.
Lecun et al. Gradient-based learning applied to document recognition. In Proceedings of the IEEE, 1998.
Lin et al. Focal loss for dense object detection. In ICCV, 2017.
Lin et al. Microsoft coco: Common objects in context. In ECCV, 2014.
Liu et al. Coupled generative adversarial networks. In NIPS, 2016.
Long et al. Learning transferable features with deep adaptation networks. In ICML, 2015.
Long et al. Unsupervised domain adaptation with residual transfer networks. In NIPS, 2016.
Long et al. Deep transfer learning with joint adaptation networks. In ICML, 2017.
Mensink et al. Distance-based image classification: Generalizing to new classes at near zero cost. PAMI, 2013.
Pan et al. Domain adaptation via transfer component analysis. Transactions on Neural Networks, 2011.
Peng et al. Visda: The visual domain adaptation challenge. In arXiv, 2017.
Real et al. Youtube-boundingboxes: A large highprecision human-annotated dataset for object detection in video. 2017.
O. Rippel, M. Paluri, P. Dollr, and L. D. Bourdev. Metric learning with adaptive density discrimination. ICLR, 2015.
Saenko et al. Adapting visual category models to new domains. In ECCV, 2010.
Salakhutdinov et al. Learning a nonlinear embedding by preserving class neighbourhood structure. In AISTATS, 2007.
Salzmann et al. Factorized orthogonal latent spaces. In AISTATS, 2010.
Sun et al. Return of frustratingly easy domain adaptation. In AAAI, 2016.
Sun et al. Deep Coral: correlation alignment for deep domain adaptation. In ECCV 2016 Workshops, 2016.
Torralba et al. Unbiased look at dataset bias. In CVPR, 2011.
Tzeng et al. Simultaneous deep transfer across domains and tasks. In ICCV, 2015.
Tzeng et al.Adversarial discriminative domain adaptation. 2017.
Tzeng et al. Deep domain confusion: Maximizing for domain invariance. arXiv, 2014.

\* cited by examiner

UNSUPERVISED DOMAIN ADAPTATION WITH SIMILARITY LEARNING FOR IMAGES

TECHNICAL FIELD

The present invention relates to artificial intelligence. More specifically, the present invention relates to systems and methods for classifying and labelling images based on similarities between input images and known labelled images.

BACKGROUND

Convolutional Neural Networks based methods achieve excellent results in large-scale supervised learning problems, where a lot of labeled data exists. Moreover, these features are quite general and can be used in a variety of vision problems, such as image captioning, object detection, and segmentation.

However, direct transfers of features from different domains do not work very well in practice, as the data distributions of domains might change. In computer vision, this problem is sometimes referred to as a domain shift. The most commonly used approach to transfer learned features is to further modify them through a process called "fine-tuning". In this case, the features are adapted by training the neural network with labeled samples from the new data distribution. In many cases, however, acquiring labeled data can be expensive.

Unsupervised Domain Adaptation deals with the domain shift problem. What is of interest are representations that are invariant to domains with different data distributions. In this scenario, the machine has access to a labeled dataset (called a source domain) and an unlabeled dataset (with a similar but different data distribution, called a target domain), and the objective is to correctly infer the labels to be assigned to the latter. Most current approaches are based on deep learning methods and consist of two steps: (i) learn features that preserve a low risk on labeled samples (i.e. the source domain) and (ii) make the features from both domains to be as indistinguishable as possible so that a classifier trained on the source domain can also be applied to the target domain.

Theoretical studies in domain adaptation suggest that a good cross-domain representation is one in which the systems are not able to identify from which domain the original input comes from. Most current approaches to domain adaptation achieve this goal by mapping cross-domain features into a common space using deep learning methods. This is generally achieved by minimizing some measure of domain variance (such as the Maximum Mean Discrepancy (MMD)), or by matching moments of the two distributions.

Another way to deal with the domain adaptation problem is to make use of adversarial training. In this scenario, the domain adaptation problem is cast as a minimax game between a domain classifier and feature learning. A neural network learns features that are, at the same time, as discriminative as possible (in the source domain) and as indistinguishable as possible (among the domains). In general, the classifier used in the source domain is a simple fully-connected network followed by a softmax over the categories (as in standard supervised learning). While this is, in principle, a good idea (given the representations are trained to be indistinguishable), it leaves the shared representation vulnerable to contamination by noise that is correlated with the underlying shared distribution.

From the above, there is therefore a need for systems and methods that provide solutions to the above issues while mitigating the shortcomings of the prior art.

SUMMARY

The present invention relates to systems and methods for addressing the cross domain issue using a similarity based classifier convolutional neural network. An input image is passed through a convolutional neural network that extracts its features. These features are then compared to the features of multiple sets of prototype representations with each set of prototype representations being extracted from and representing a category of images. The similarity between the features of the input image and the features of the various prototype representations is scored and the prototype representation whose features are most similar to the features of the input image will have its label applied to the input image. The classifier is trained using images from a source domain and the input images are from a target domain. The training for the classifier is such that the classifier will be unable to determine if a specific data point is from the source domain or from the target domain.

In one aspect, the present invention provides a method for assigning labels to unlabeled input images, the method comprising:
  a) receiving an unlabeled input image;
  b) comparing features of said input image to features of a plurality of prototype representations, each of said plurality of prototype representations being representative of a category of images and each prototype representation being associated with a specific label;
  c) determining a similarity between features of said input image and features of each of said plurality of prototype representations;
  d) determining which of said plurality of prototype representations is most similar to said input image;
  e) associating said input image with a specific label associated with a prototype representation which is most similar to said input image;
  wherein
  features of said input image are extracted prior to step b) by way of a convolutional neural network; and
  said input image and images in categories of images represented by said prototype representations are in different domains.

In another aspect, the present invention provides a system for determining an input image's content, the system comprising:
  a first convolutional neural network for receiving said input image and extracting features of said input image;
  a database of pre-extracted features of prototype representations, each prototype representation being representative of a category of images;
  feature comparison block for receiving said features of said input image from said first convolutional neural network and for receiving said features of said prototype representations from said database, said feature comparison block also being for comparing features of said input image and features of said prototype representations to determine which of said prototype representations is most similar to said input image;
  wherein
  said system outputs an indication of which of said prototype representation is most similar to said input image.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
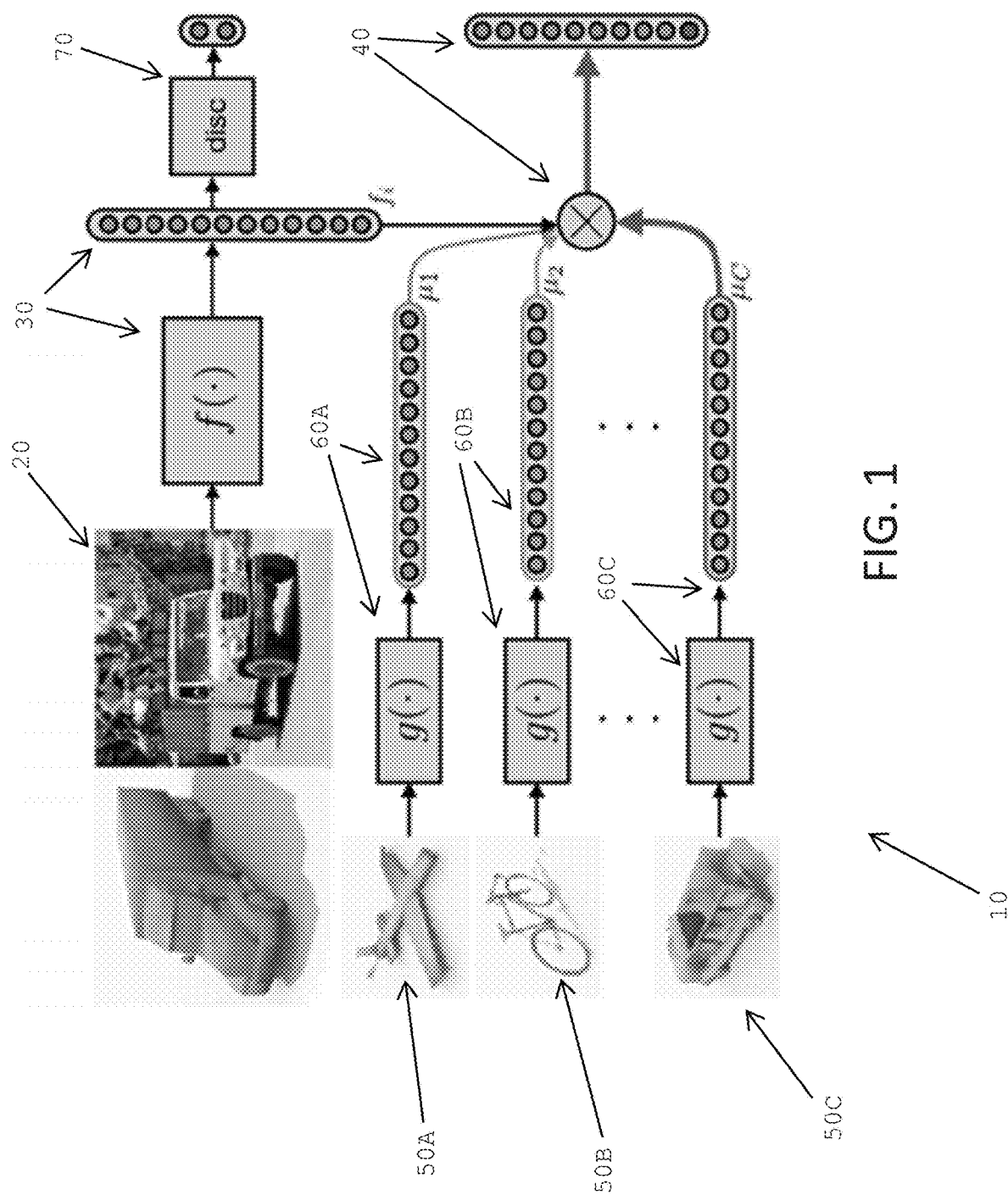
FIG. 1 is a schematic diagram detailing one aspect of the present invention.

Referring to FIG. 1, a schematic diagram illustrating one aspect of the present invention is presented. In the system 10, an input image 20 is passed through a first convolutional neural network 30 that extracts the input image's features. These features are then compared, using a comparison block 40, with the extracted features of multiple prototype representations 50A, 50B, 50C. These prototype representations 50A . . . 50C were previously passed through second convolutional neural networks 60A . . . 60C to extract their features. The comparison block 40 determines which of the prototype representations 50A . . . 50C, based on the extracted features, are most similar to the input image 20. The label for the prototype representation that is most similar to the input image 20 is then assigned to the input image 20.

It should be clear that the content of each of the different prototype representations represents a different class or a different category of items or subjects. Thus, it can be seen from FIG. 1 that, as examples, the three categories represented by the illustrated prototype representations are: airplanes (prototype representation 50A), bicycles (prototype representation 50B), and trucks (prototype representation 50C). The prototype representations are, preferably, extracted from multiple images of the category that the prototype representation is representing.

From FIG. 1, it should be clear that the input image 20 is most similar to the prototype representation 50C (i.e. a prototype representation of a truck) and that the output of the system is a labeled input image with its label being the same as the label for prototype representation 50C.

To train the various neural networks used in the system 10, a fully connected discriminator neural network 70 is also used. The first convolutional neural network ($f(\cdot)$) is trained using source domain images and target domain images, with the desired goal being that the results of this first neural network should not be classifiable as being from either the source domain or the target domain. As noted above, the source domain and the target domain are, of course, different domains. During training, the output of $f(\cdot)$ is passed through the discriminator network and through a classifier network that determines probabilities as to whether the output is from the source domain or the target domain. Once the discriminator network and the classifier network are unable to determine whether the output of $f(\cdot)$ is from the source or the target domain, then the network $f(\cdot)$ is considered trained.

It should be clear that the present invention proposes a different way to perform classification while keeping the adversarial domain-confusion component. The present invention, in one embodiment, uses a similarity-based classifier in which each input image is compared to a set of prototypes (or centroids). The label associated with the prototype representation that best matches the query or input image is given to that query or input image. For clarity, these prototypes are vector representations that are representative of each category that appears in the dataset. These prototypes are learned at the same time as the image embeddings, and the whole system can use backpropagation to be more efficiently trained.

Tests have shown that the present invention is more robust than the prior art, especially when applied to the domain shift issues between two datasets. Results in two important large-scale domain adaptation datasets (Office-31, which contains images of office objects in three different domains and VisDA, a large-scale dataset focused on simulation-to-reality shift) have shown that the present invention is both viable and efficient.

It should be clear that the present invention may be used for multiple purposes. More specifically, the present invention may be used to train systems using synthetic data (e.g. using 3D rendered images or game engine based images). One use the present invention would be to use a virtually unlimited number of labeled (and synthetic) images to train the invention's system and then to adapt the system of the invention to handle natural images. Indeed, in certain areas of research, such as robotics vision or reinforcement learning, acquiring training samples can be very expensive. Training in a synthetic (i.e. artificially generated) domain and then transferring the learned features to real-world environments can be one solution to alleviate the high cost of acquiring and labeling training data.

For clarity, in the domain adaptation problem, there is access to labeled images $X_S=\{(x_i^S, y_i^S)\}_{i=0}^{N_S}$ drawn from a source domain distribution $p_S(x,y)$ and to target images $X_t=\{(x_i^t, y_i^t)\}_{i=0}^{N_t}$ drawn from a target distribution $p_t(x,y)$. In the unsupervised setting, there is no information about the label on the target domain.

In the present invention, the problem of unsupervised domain adaptation is addressed using a similarity-based classifier. As can be seen from FIG. 1, one aspect of the invention uses two different components: (i) the domain-confusion component (i.e. the discriminator), which forces the features of both domains, $f(X_S)$ and $f(X_t)$, to be as indistinguishable as possible and (ii) a classifier based on a set of prototypes, $\mu_c$ (one for each category $c \in \{1, 2, \ldots, C\}$). Both components are trained jointly and in an end-to-end fashion.

This approach is based on the assumption that there exists an embedding for each category such that all the points of the category cluster around it, independent of its domain. Inference is then performed in a test image by simply finding the most semantically similar prototype.

The classifier network used in the present invention is composed of C different prototypes, with one prototype per category. Each prototype represents a general embedding for a category, incorporating all of the category's variations. It is assumed that there exists a representation space in which all samples of a given category can be clustered around its corresponding prototype.

Each prototype is represented by an m-dimensional vector $\mu_c \in \mathbb{R}^m$ parametrized by a convolutional neural network $g(\cdot)$, with trainable parameters $\theta_g$. The prototypes are computed by the average representation of all source samples belonging to the category c:

$$\mu_c = \frac{1}{|X^c|} \sum_{x_i^s \in X^c} g(x_i^s) \qquad (1)$$

where $X^c$ is the set of all images in the source domain labeled with category c. Similarly, the input images (from either domain) are represented as a n-dimensional vector $f_i = f(x_i) \in \mathbb{R}^n$, with the vector being produced by passing the input image through a convolutional neural network $f(\bullet)$ parametrized by $\theta_f$.

By leveraging the powerful representations of convolutional neural networks, the present invention uses a simple model that can predict which of the prototypes (and therefore categories) best describes a given input. For this purpose, a similarity metric between images and prototypes is learned. The similarity between an input image $x_i$ and prototype $\mu_c$ is defined simply as a bilinear operation:

$$h(x_i, \mu_c) = f_i^T S \mu_c \qquad (2)$$

with $S \in \mathbb{R}^{n \times m}$ being the trainable parameters. S is an unconstrained bilinear similarity operator, and it does not have to be positive or symmetric. In FIG. 1, this similarity metric is represented by the comparison block 40.

Regarding the convolutional neural networks $f(\bullet)$ and $g(\bullet)$, these networks do not share the same parameters. This is particularly important in the domain adaptation scenario in which the representations (from the input and from the prototypes) have different roles in the classification. On the one hand, the domain features $f_i$ should be domain invariant while simultaneously matching one of the prototypes $\mu_c$. On the other hand, the embedding prototypes should be as close as possible to the source domain images that represents its category. In the case of single domain classification, it would make sense to use the same network for f and g to reduce the capacity of the system, since there is no shift in the domain. In this case, the model would be similar to Siamese Networks.

It should be clear that the neural networks used are trained to discriminate the target prototype $\mu_c$ from all other prototypes $\mu_k$, (with k≠c), given a labeled image. The output of the network is interpreted as class conditional probabilities by applying a softmax function over the bilinear operator:

$$p_\theta(c \mid x_i, \mu_1, \dots, \mu_C) = \frac{e^{h(x_i, \mu_C)}}{\sum_k e^{h(x_i, \mu_k)}} \qquad (3)$$

$\theta = \{\theta_f, \theta_g, S\}$ represents the set of all trainable parameters of the system. Learning is achieved by minimizing the negative log-likelihood (with respect to $\theta$), over all labeled samples $(x_i, y_i) \in X^S$:

$$\mathcal{L}_{class}(\theta) = -\sum_{(x_i, y_i)} \left[ h(x_i, \mu_{y_i}) - \log \sum_k e^{h(x_i, \mu_k)} \right] + \gamma \mathcal{R} \qquad (4)$$

$\mathcal{R}$ is a regularization term that encourages the prototypes to encode different aspects of each category. At each training iteration, the prototypes are approximated by choosing a random subset of examples for each category.

The regularizer is modeled as a soft orthogonality constraint. Let $P_\mu$ be a matrix whose rows are the prototypes, the regularization term is written as:

$$\mathcal{R} = \|P_\mu^T P_\mu - I\|_F^2, \qquad (5)$$

where $\|\bullet\|_F^2$ is the squared Frobenius norm and I is the identity matrix.

To train the system, the classifier is trained on the source domain (labeled samples) and this is then applied to the target domain (unlabeled samples). To achieve this goal, the system learns features that maximize the domain confusion while preserving a low risk on the source domain.

The domain-invariant component is responsible for minimizing the distance between the empirical source and target feature representation distributions, $f(X_S)$ and $f(X_t)$. Assuming this is the case, the classifier trained on the source feature representation can thus be directly applied to the target representation.

Domain confusion is achieved using a domain discriminator D, parametrized by $\theta_d$. The discriminator classifies whether a data point is drawn from the source or the target domain, and the discriminator is optimized following a standard classification loss:

$$\mathcal{L}_{disc}(\theta, \theta_d) = -\sum_{i=0}^{N_s} \log D(f(x_i^s)) - \sum_{i=0}^{N_t} \log(1 - D(f(x_i^t))) \qquad (6)$$

Domain confusion is achieved by applying the Reverse Gradient (RevGrad) algorithm which optimizes the features to maximize the discriminator loss directly. Reference may be made to the article "Domain-adversarial training of neural networks" in the *Journal of Machine Learning Research*, 2016 for more details. The contents of this article are hereby incorporated herein by reference.

The system is trained to jointly maximize the domain confusion (between source and target) and to infer the correct category on the source (labeled) samples through the similarity-based classifier described above. The final goal is therefore to optimize the following minimax objective:

$$\min_{\theta_f, \theta_g, S} \max_{\theta_d} \mathcal{L}_{class}(\theta_f, \theta_g, S) - \lambda \mathcal{L}_{disc}(\theta_f, \theta_d), \qquad (7)$$

where $\lambda$ is a balance parameter between the two losses. The objective is optimized using stochastic gradient descent with momentum.

At inference time, the prototypes are computed a priori, following Equation 1, and stored in memory. The similarity between a target domain test image and each prototype is computed, and the label that best matches the query is outputted.

In one implementation, the parameters of networks f and g are initialized with a ResNet-50 that was pretrained to perform classification on the ImageNet dataset, and the classification layer is removed. The discriminator network and the bilinear classifier are initialized randomly from a uniform distribution. Parameters used are as follows: the balance parameter $\lambda = 0.5$ and the regularization coefficient $\gamma = 0.1$ (it was observed that the system is robust to this hyperparameter). A learning rate of $10^{-5}$ is used, with a weight decay of $10^{-5}$ and a momentum of 0.99.

Since the similarity matrix and the discriminator are trained from scratch, their learning rates are set to be 10 times that of the other layers.

During training, the images (from both domains) are resized such that the shorter dimension is of size 300 pixels and a patch of 224×224 is randomly sampled. Each minibatch has 32 images from each domain. At each training iteration, the prototypes are approximated by picking one random sample for each class. It was noticed that the training converges with this design choice and it was found to be more efficient.

The discriminator is a simple fully-connected network. It contains two layers, each of dimension 1024 and ReLU non-linearity, followed by the domain classifier. It receives, as input, the output of network f and outputs the probability of which domain the input comes from (this probability is, again, modeled by a softmax). It should be clear that a softmax function is a function that highlights the largest values and suppresses values which are significantly below the maximum value.

The bilinear operation is parametrized with a low-rank approximation, $S=U^T V$ ($U,V \in \mathbb{R}^{n \times m}$, m=512) and Equation 2 thus becomes:

$$h(x_i, \mu_C) = (Uf_i)^T \cdot (V\mu_C) \quad (8)$$

This parametrization brings multiple benefits. It allows for control of the system capacity. As well, it allows for the system to be trivially implemented in any modern deep learning framework and the system benefits from an efficient implementation. Finally, the parametrization also provides fast inference, as the right side of h is independent of the input image—it can be computed only once and stored in memory.

At inference time, the shorter dimensions of the test image are resized to 300 pixels, as in the training stage. The model is applied densely at every location, resulting in an output with spatial dimensions bigger than 1. The output is averaged over the spatial dimensions to achieve a one-dimensional vector. Because the similarity measure is a bilinear operation, the averaging can be seen as an ensemble over different spatial locations of the test image.

It should be clear that, preferably, the input images and the images used to produce the prototype representations are converted to a common resolution prior to being passed through the relevant convolutional neural networks f(•) and g(•). Extracting features from images of different resolutions may produce less than useful features.

Figure 2:
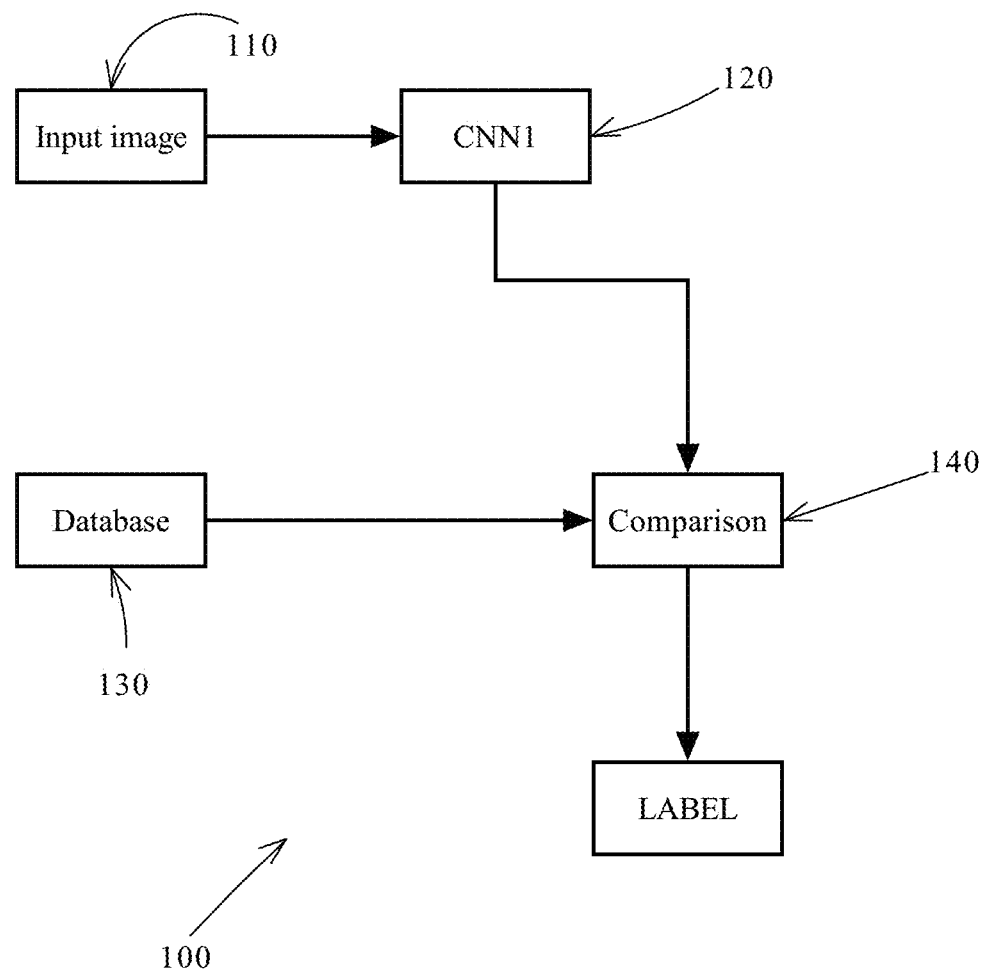
FIG. 2 is block diagram illustrating another aspect of the present invention.

Referring to FIG. 2, a block diagram of another aspect of the invention is illustrated. The aspect of the invention relates to a system for identifying content of an input image based on prototype representations representative of categories of image content. This system 100 has an input image 110 being fed into a pretrained and fully connected convolutional neural network 120 that extracts the features of the input image 110. A database 130 contains the features of different prototype representations and these features are to be compared to the features from the input image 110. As can be imagined, the features of the different prototype representations (with each prototype representations being representative of a different category or class of image content) were previously extracted using a different convolutional neural network (not shown) and these features were stored previously in the database. These prototype features are sent to a comparator block 140 along with the features from the input image 110. The output of the comparator block 140 is an indication as to which prototype representation is most similar to the input image based on their features. Or, in one implementation, the output would be a label for the input image, this label being the label of the prototype representation which was most similar to the input image.

It should be noted that the system in FIG. 2 may be implemented using any suitable data processing system. As such, for example, if an input image contains an image of a mode of transportation, the system can be used to determine what type of mode of transportation is in the input image. Prototype representations representative of a car, a truck, a bicycle, a train, an airplane, etc., etc. can be used and, once the similarity of the input image to the prototype representations have been determined, this can indicate the content of the input image. Of course, other images and other uses of the system can be contemplated.

Figure 3:
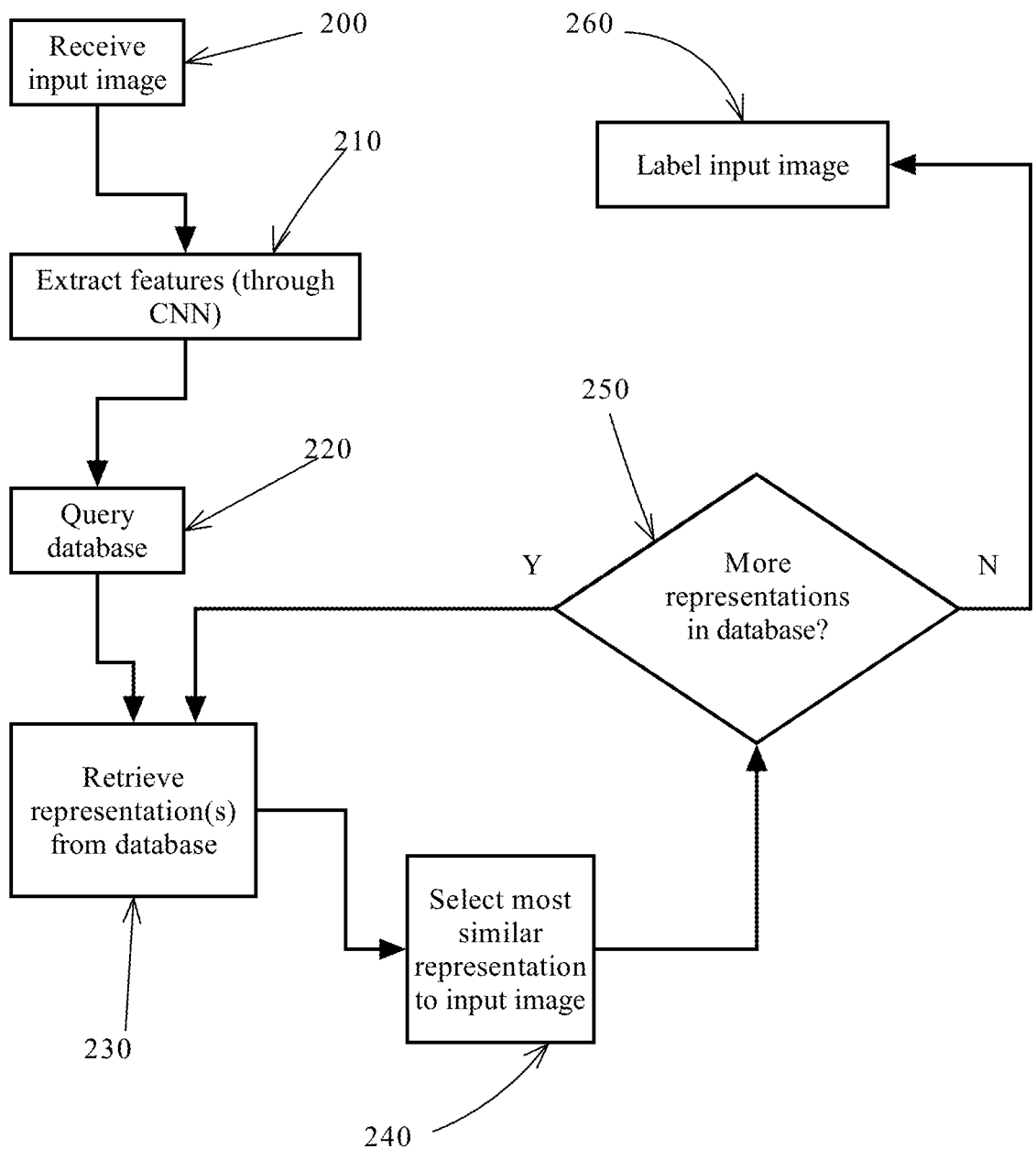
FIG. 3 is a flowchart detailing the steps in a method according to another aspect of the present invention.

The system in FIG. 2 is thus used to implement a method whose steps are detailed in FIG. 3. Referring to FIG. 3, the method begins at step 200, that of receiving an input image. This input image is then passed through a convolutional neural network in step 210 to extract a representation representative of the input image's features. Concurrently or soon after the features have been extracted, a database is then queried for one or more prototype representations of different classes or categories of image content (step 220). These prototype representations are retrieved from the database and compared (step 230) with the extracted features from the input image. Of the retrieved representations, the most similar to the extracted features of the input image is selected (step 240). The logic then determines if there are more representations to be compared to the features from the input image (step 250). If there are more representations, then the logic loops back to step 230 to retrieve these as yet uncompared representations. If, however, no more representations are to be compared to the extracted images, then the logic moves to step 260, that of assigning a label to the input image, the label being the label of the representation that is most similar to the features of the input image.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A computer-implemented method for assigning labels to unlabeled input images, the method being executable by a server, the method comprising:
   a) receiving an unlabeled input image;
   b) comparing features of said input image to features of a plurality of prototype representations, each of said plurality of prototype representations being representative of a category of images and each prototype representation being associated with a specific label;
   c) determining a similarity between features of said input image and features of each of said plurality of prototype representations;
   d) determining which of said plurality of prototype representations is most similar to said input image;
   e) associating said input image with a specific label associated with a prototype representation which is most similar to said input image;
   wherein
   features of said input image are extracted prior to step b) by way of a first convolutional neural network;
   said input image and images in categories of images represented by said prototype representations are in different domains; and
   said first convolutional neutral network is trained using a domain discriminator, said domain discriminator being for classifying whether a data point is from a source domain or a target domain, said first neural network being trained to thereby maximize an amount of data points for which said domain discriminator is unable to determine if said data points are from said source domain or said target domain.

2. The method according to claim 1, wherein said images in said categories of images are artificially generated images.

3. The method according to claim 1, wherein each of said prototype representations comprises an m-dimensional vector parametrized by a second convolutional neural network with trainable parameters.

4. The method according to claim 3, wherein each of said prototype representations is computed by an average representation of all source images belonging to a category c:

$$\mu_c = \frac{1}{|X^c|} \sum_{x_i^s \in X^c} g(x_i^s)$$

where $X^C$ is a set of all images in said source domain labeled with category c.

5. The method according to claim 1, wherein said input image is represented by an n-dimensional vector created by passing said input image through said first convolutional neural network.

6. The method according to claim 1, wherein a similarity between features in said input image and features in said prototype representations is determined using a bilinear operation.

7. A system for determining an input image's content, the system comprising:
   a first convolutional neural network for receiving said input image and extracting features of said input image;
   a database of pre-extracted features of prototype representations, each prototype representation being representative of a category of images;
   feature comparison block for receiving said features of said input image from said first convolutional neural network and for receiving said features of said prototype representations from said database, said feature comparison block also being for comparing features of said input image and features of said prototype representations to determine which of said prototype representations is most similar to said input image;
   wherein
   said system outputs an indication of which of said prototype representation is most similar to said input image.
   wherein said first convolutional neural network is trained using a domain discriminator, said domain discriminator being for classifying whether a data point is from a source domain or a target domain, said first neural network being trained to thereby maximize an amount of data points for which said domain discriminator is unable to determine if said data points are from said source domain or said target domain.

8. The system according to claim 7, wherein features of said input image are represented by an n-dimensional vector created by passing said input image through said first convolutional neural network.

9. The system according to claim 7, wherein features of each of said prototype representations are represented by an m-dimensional vector parametrized by a second convolutional neural network with trainable parameters.

* * * * *